(12) United States Patent  
Bayly et al.

(10) Patent No.: US 6,588,147 B2  
(45) Date of Patent: Jul. 8, 2003

(54) JUVENILE PLANT HOLDING DEVICE

(75) Inventors: Peter Kingsley Bayly, Euroa (AU); Justin McCarthy, Lower Templestowe (AU)

(73) Assignee: Norwood Industries Pty Ltd. (AU)

( * ) Notice: Subject to any disclaimer, the term of this patent is extended or adjusted under 35 U.S.C. 154(b) by 0 days.

(21) Appl. No.: 09/982,740

(22) Filed: Oct. 18, 2001

(65) Prior Publication Data

US 2002/0073614 A1 Jun. 20, 2002

(30) Foreign Application Priority Data

Oct. 19, 2000 (AU) .............................................. PR0881

(51) Int. Cl.[7] .............................................. A01G 17/04
(52) U.S. Cl. .......................................................... 47/47
(58) Field of Search ................................. 47/47, 44, 45, 47/46; 43/18.1 CT; 138/106

(56) References Cited

U.S. PATENT DOCUMENTS

| 936,402 | A | * | 10/1909 | Beasley | |
|---|---|---|---|---|---|
| 2,070,495 | A | * | 2/1937 | Strutz et al. | |
| 2,174,955 | A | * | 10/1939 | Wade | 47/47 |
| 3,239,171 | A | * | 3/1966 | Binyon | 248/27.8 |
| 3,324,592 | A | * | 6/1967 | Prenner et al. | 47/47 |
| 4,176,494 | A | | 12/1979 | Boucher et al. | |
| 4,441,273 | A | * | 4/1984 | McMickle et al. | 403/334 |
| 4,860,489 | A | * | 8/1989 | Bork | 47/47 |
| 5,349,780 | A | * | 9/1994 | Dyke | 24/458 |
| 5,804,305 | A | * | 9/1998 | Slat et al. | 428/36.6 |

FOREIGN PATENT DOCUMENTS

EP      0882391 A2 * 12/1998

* cited by examiner

Primary Examiner—Peter M. Poon  
Assistant Examiner—Jeffrey L. Gellner  
(74) Attorney, Agent, or Firm—Lerner, David, Littenberg, Krumholz & Mentlik, LLP

(57) ABSTRACT

A stake for use with plants including:
- a foundation means for stabilizing the stake being locatable in a relatively fixed position near the plant;
- a foundation stem extending from the foundation means, at least a portion of the foundation stem being hollow;
- a holding means for holding the plant or a display object, the holding means being associated with the foundation stem and remote from the foundation means.

48 Claims, 4 Drawing Sheets

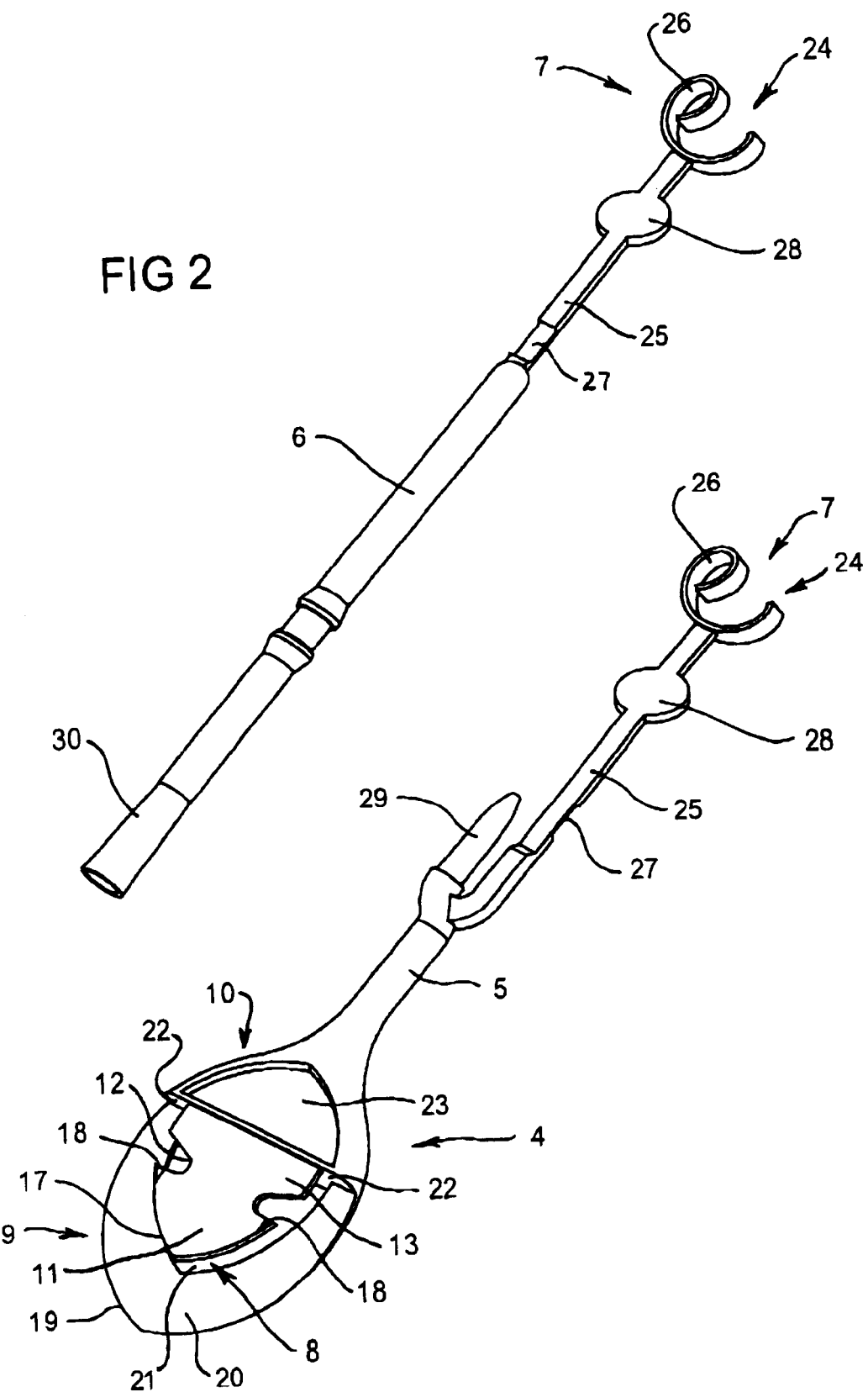

JUVENILE PLANT HOLDING DEVICE

This invention relates to a stake for use with plants. The stake is suitable for use with plants located in pots, and it will be convenient to hereinafter describe the invention in relation to this particular application. It should be appreciated however that the invention has wider application.

Stakes have numerous uses in horticulture including stabilizing plants during their development or relocation, and presenting display objects such as plant labels or advertising material. In both these situations, it is preferred that the stake be serviceable in that it can accommodate forces transverse to its longitudinal axis without excessive displacement occurring at the stake free end.

Stakes previously have been formed from solid timber or plastic and are pushed into the soil adjacent the plant with a plastic coated wire tie used to attach the stake to the plant, or display object. This arrangement is rather labour intensive to install, mainly as a result of the tie, and can be ineffective in particular in relation to retaining a display object at the free end of the stake as the object tends to slide down the stake. Furthermore, the wire tie can tend to surround rather than engage the trunk whereby movement of the stake or trunk can lead to bruising of the trunk. Still furthermore, it would be preferred to reduce the amount of material required to produce the stake whilst not adversely affecting the serviceability of the stake.

According to one aspect of this invention there is provided a stake for use with plants including:
  a foundation means for stabilizing the stake being locatable in a relatively fixed position near the plant;
  a foundation stem extending from the foundation means, at least a portion of the foundation stem being hollow;
  a holding means for holding the plant or a display object, the holding means being associated with the foundation stem and remote from the foundation means.

The forces required to be accommodated by the stake will be predominantly transverse to the longitudinal axis of the stem. The material forming the stem at or immediately adjacent the axis thereof would have minimal effect in resisting the predominant transverse forces acting on the stem. Accordingly, a relatively serviceable stake can be produced with a hollow stem. It should be appreciated that by making the stem hollow, the amount of material required to produce the stake can be reduced and therefore so can the cost of the stake.

The stake preferably includes an extension stem having a further holding means remote from the foundation means. The extension stem is preferably hollow. The extension stem may be formed integrally with the foundation means or foundation stem. Alternatively and preferably, the extension stem is formed independently of the rest of the stake. It is preferred that the extension stem is releasably connectable to the foundation means or foundation stem.

The stake preferably includes a connection means having a male connecting member associated with the foundation stem or foundation means and a female connecting member associated with the extension stem at a connecting end of the extension stem remote from the further holding means. Alternatively, the stake preferably includes a connection means having a female connecting member associated with the foundation stem or foundation means and a male connecting member associated with the extension stem at a connecting end of the extension stem remote from the further holding means. The holding means of the foundation stem and/or extension stem preferably includes one or more holding devices. The holding device may be a plant holder for holding a plant having an arm extending from the foundation stem and/or the extension stem with a plant surround located at a distal end of the arm, the plant surround is in the form of at least a partial helix which in use accommodates the trunk of the plant. The helix is preferably resilient to urge the helix to engage the trunk. It is preferred that the arm include a hinge to allow the arm to be angled in a direction transverse to the foundation or extension stem. The hinge is preferably resilient to urge the arm to align with the longitudinal axis of the stem to facilitate urging the plant surround to engage the trunk of the plant.

Alternatively the holding device may be for holding a display object, the display object having an aperture into which the display holder is inserted to locate the display object in a display position, the holding device having restricting means for restricting movement of the display object when in the display position. The restricting means preferably includes a pair of similarly angled surfaces located on opposite sides of a display holder having upwardly and downwardly facing surfaces respectively, the surfaces limiting axial and pivoting movement of the display object relative to the display holder. The restricting means further preferably includes a pair of wings located adjacent the angled surfaces for engagement by the display object, the wings providing lateral stability to the display object. The restricting means also preferably includes limiting means for limiting rotational movement of the display object relative to the display holder, the limiting means being located at a distal end of the upwardly facing surface which engages an edge of the display object.

The foundation means preferably includes a retention means being co operable with a plant container containing the plant for impeding removal of the stake when positioned near the plant. The retention means may include a head, neck and body connected to the head by the neck, for insertion into a control zone of a container, wherein the insertion of the head into the control zone causes resilient deformation of the head and/or control zone to allow passage of the head through the control zone. Alternatively, the retention means includes a lip engaging member which in use engages a lip of the plant container. The foundation means may also include a fin member having a pair of bearing surfaces for location within the soil surrounding the plant. The foundation means may also include a junction means extending from the retention means and/or the fin member having a rim engaging surface for engaging the rim of the container to facilitate stabilisation of the foundation means.

It is preferred that the foundation means and/or the junction means is hollow.

According to another aspect of this invention there is provided a stake for use with plants including:
  a foundation means for stabilising the stake being locatable in a relatively fixed position near the plant;
  a foundation stem extending from the foundation means;
  a plant holder for holding the plant, the plant holder being associated with the foundation stem and remote from the foundation means, the plant holder including a plant surround in the form of at least a partial helix which in use surrounds the trunk of the plant at least partially.

The plant holder preferably includes an arm extending from the foundation stem, the plant surround being located at the free end of the arm. It is preferred that the arm include a hinge to allow the arm to be angled in a direction transverse to the foundation or extension stem. The hinge is preferably resilient to urge the arm to align with the longitudinal axis of the stem to facilitate urging the plant surround to engage the trunk of the plant. The helix is preferably resilient to urge the helix to engage the trunk of the plant.

The stake preferably further includes an extension stem with a further plant holder or a display holder. The extension stem is preferably formed integrally with the foundation means or foundation stem. Alternatively, the extension stem is formed independently of the rest of the stake. It is preferred that the extension stem is releasably connectable to the foundation means or foundation stem. The stake preferably includes a connection means having a male connecting member associated with the foundation stem or foundation means and a female connecting member associated with the extension stem at a connecting end of the extension stem remote from the further plant holder or display holder. Alternatively, the stake includes a connection means having a female connecting member associated with the foundation stem or foundation means and a male connecting member associated with the extension stem at a connecting end of the extension stem remote from the further plant holder or display holder.

The display holder is preferably for holding a display object, the display object having an aperture into which the display holder is inserted to locate the display object in a display position, the display holder having restricting means for restricting movement of the display object when in the display position. The restricting means preferably includes a pair of similarly angled surfaces located on opposite sides of a display holder having upwardly and downwardly facing surfaces respectively, the surfaces limiting axial and pivoting movement of the display object relative to the display holder. It is further preferred that the display holder includes a pair of wings located adjacent the angled surfaces for engagement by the display object, the wings providing lateral stability to the display object. It is further preferred that the display holder also includes limiting means for limiting rotational movement of the display object relative to the display holder, the limiting mans being located at a distal end of the upwardly facing surface which engages an edge of the display object.

The foundation means preferably includes a retention means being co operable with a plant container containing the plant for impeding removal of the stake when positioned near the plant. The retention means may include a head, neck and body connected to the head by the neck, for insertion into a control zone of a container, wherein the insertion of the head into the control zone causes resilient deformation of the head and/or control zone to allow passage of the head through the control zone. Alternatively, the retention means includes a stake wherein the retention means includes a lip engaging member which in use engages a lip of the plant container. The foundation means may also include a fin member having a pair of bearing surfaces for location within the soil surrounding the plant. The foundation means also preferably includes a junction means extending from the retention means and/or the fin member having a rim engaging surface for engaging the rim of the container to facilitate stabilisation of the foundation means.

The foundation means, junction, foundation stem and/or extension stem may be hollow. The stake is preferably formed from a plastic material using a gas injection method.

It will be convenient to hereinafter describe the invention in greater detail by reference to the accompanying drawings which illustrate one form of the device incorporating an embodiment of the invention. The particularity of the drawings and the related description is not to be understood as superseding the generality of the broad identification of the invention as given in the claims.

FIG. 2 illustrates the stake device in diagrammatic form with the extension stem detached from the foundation stem.

Figure 3A:
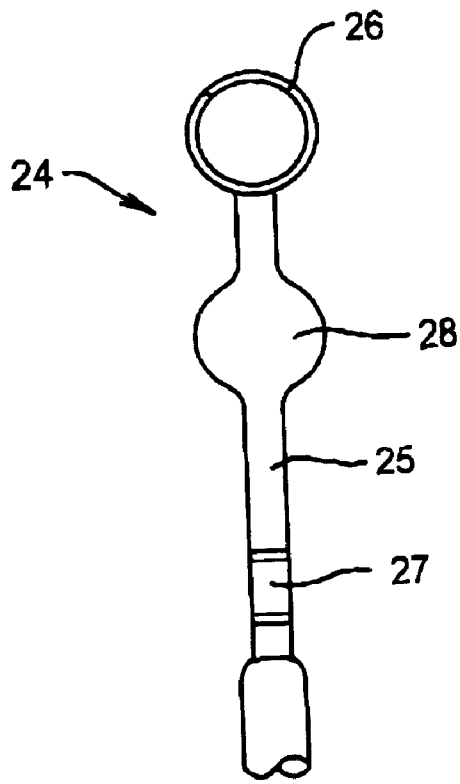
Figure 3B:
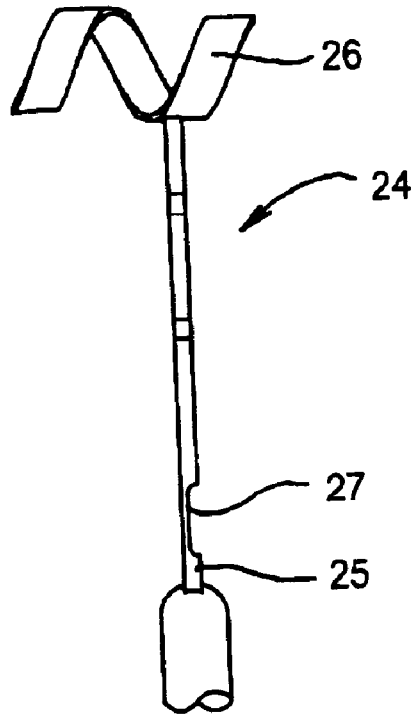

FIGS. 3a and 3b illustrated in diagrammatic form front and side view of the plant holder according to a preferred embodiment of the invention.

Figure 4A:
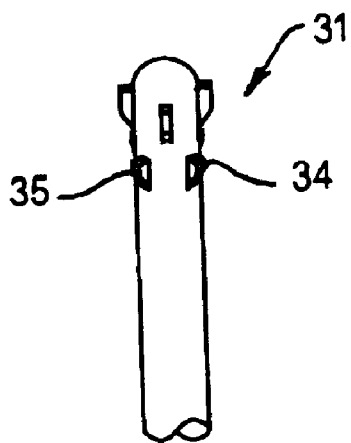
Figure 4B:
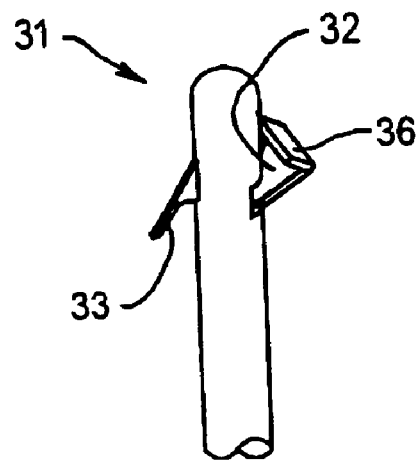

FIGS. 4a and 4b illustrated in diagrammatic form a front and side view of the display holder according to a preferred embodiment of the invention.

Figure 5:
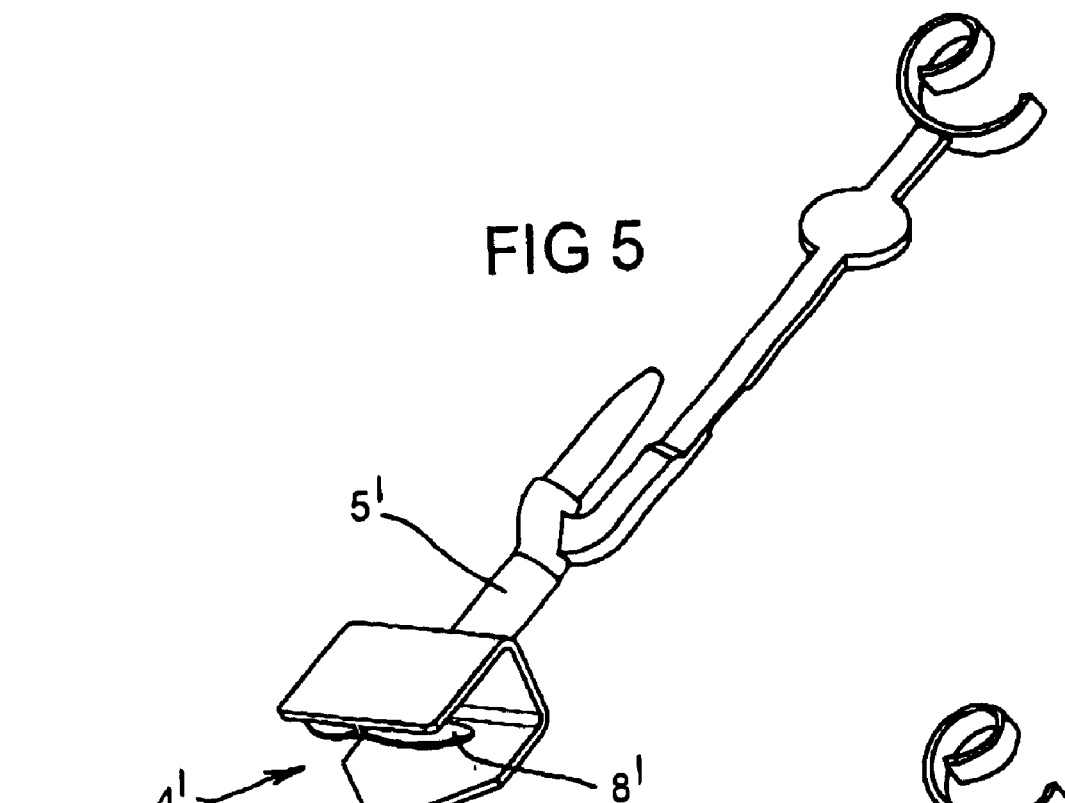

FIG. 5 illustrates the stake device with an alternate form of facilitation means.

Figure 6:
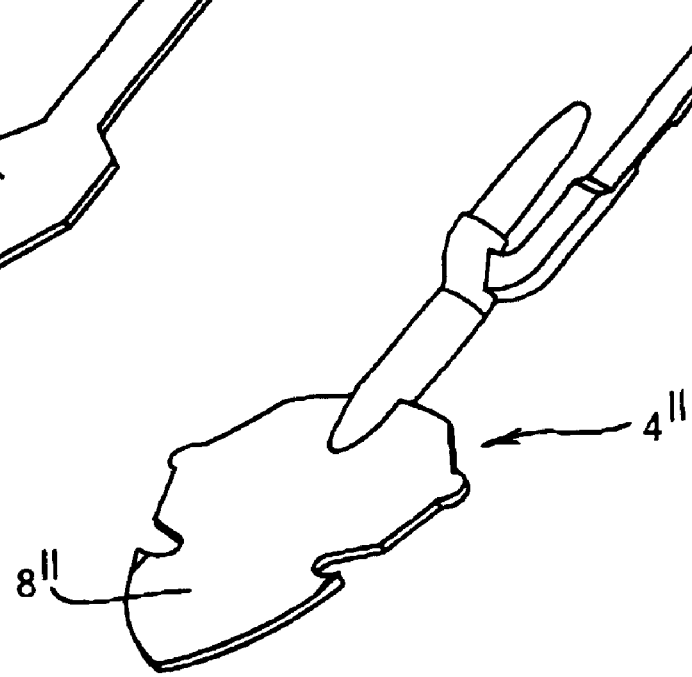

FIG. 6 illustrates a further alternate form of facilitation means.

Figure 1:
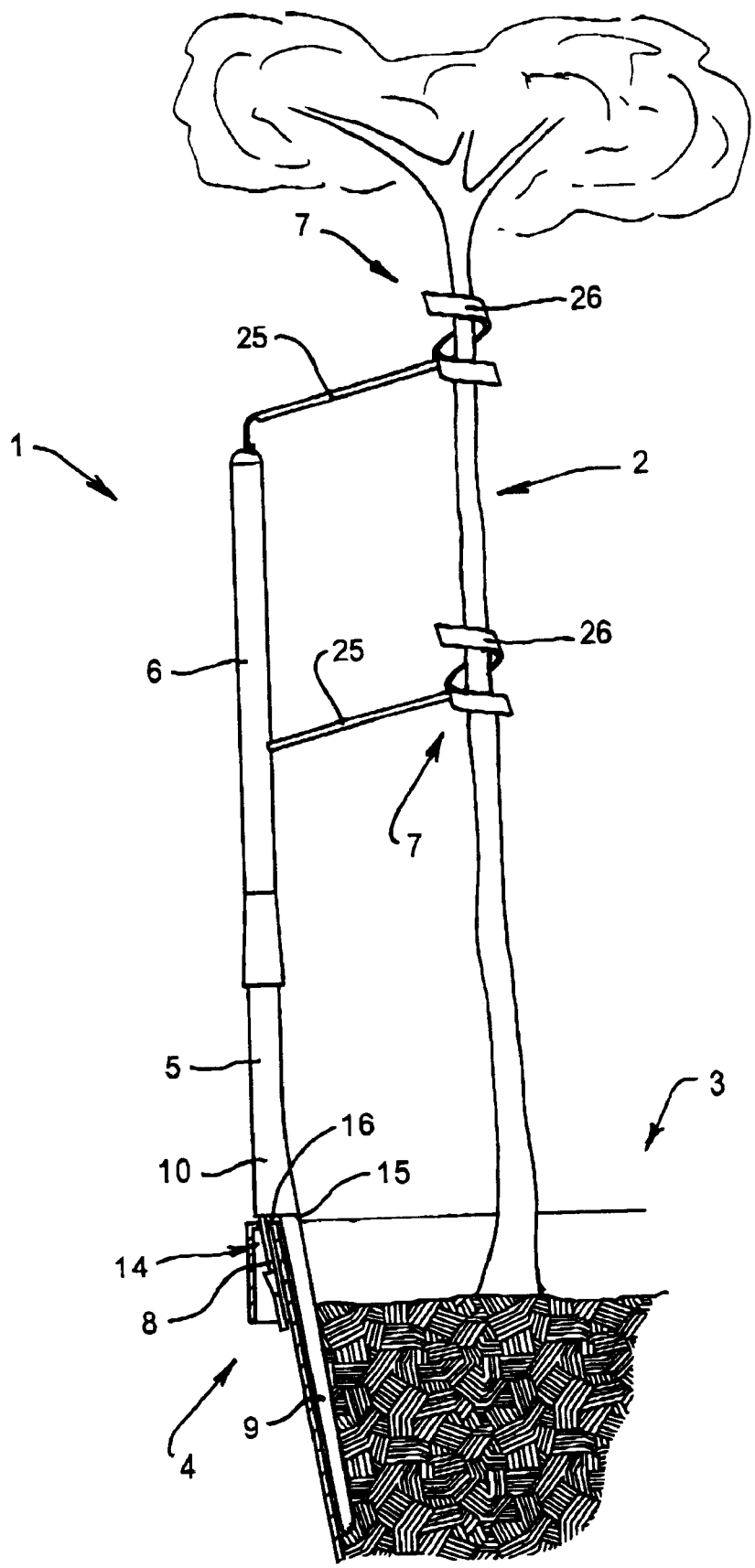
FIG. 1 illustrates the stake device in a diagrammatic form holding a plant located in a container.

Referring to FIG. 1 there is illustrated a stake (1) stabilizing a plant (2) located in a pot or plant container (3). The stake 1 according to the invention is particularly suited for use with plants (2) located in pots or plant containers (3) however it should be appreciated that the stake (1) may be used with plants (2) not located in such containers. The stake (1) illustrated includes a foundation means (4) locatable in a relatively fixed position adjacent the plant (2) and a foundation stem (5) extending from the foundation means (4). An extension stem (6) is connectable to the foundation stem (5) with holding means (7) being associated with both the foundation stem (5) and extension stems (6) respectively. The connection of the holding means (7) to the foundation stem (5) is partly obscured by the extension stem (6) and can be better seen in FIG. 2.

FIG. 2 illustrates the preferred form of foundation means (4), foundation stem (5), extension stem (6) and associated holding means (7). The foundation means (4) illustrated includes a retention means (8) and a fin member (9) both extending from a junction (10). It should be appreciated that the foundation means (4) may including either the retention means (8) or the fin member (9), or both as illustrated. Alternate forms of foundation means are described in relation to FIGS. 5 and 6. The retention means (8) preferably includes a head (11), neck (12) and body (13) with the retention means (8) connected to the junction (10) via the body (13). The retention means (8) can be inserted into a control zone (14) of the pot or plant container (3) with the control zone (14) and the retention means (8) configured to impede retraction of the retention means (8) from the control zone (14).

The control zone (14) illustrated in FIG. 1 is associated with the lip (15) of the pot or plant container (3) however it should be appreciated that the control zone (14) may be located elsewhere. The control zone (14) is illustrated in its simplest form as an opening or slit (16) in the lip (15) of the pot or plant container (3) wherein the lip (15) surrounding the slit (16) and/or head (11) of the retention means may deform to allow the head (11) to pass the slit (16). The head (11) preferably incudes a leading portion (17) which is relatively narrow in comparison to the slit (16) to facilitate its passage through the slit (16). Where the neck (12) is in the slit (16) the neck is configured to allow the slit (16) to return at least partially to its predeformed configuration so that the lip (15) adjacent the slit (16) provides stop means for engaging at least one shoulder (18) on the head (11) adjacent the neck (12). It is further preferred that the body (13) be configured relative to the slit (16) to facilitate impeding further insertion of the retention means (8) past the neck (12). It should be appreciated that the body (13) is clearly not an essential feature as its function may be achieved by the junction (10) being configured to impede further insertion. Other forms of control zone (14) are also clearly possible.

The fin member (9) illustrated in FIG. 2 extends from the junction (10) and is spaced from the retention means (18).

The fin member (9) includes a relatively thin portion (19) remote from the junction (10) for facilitating its insertion into the soil. The fin member (9) provides a pair of bearing surfaces (20) for acting against the soil and possibly the inner surface of the pot or plant container (3) providing transverse stability to the stake (1). The fin member (9) illustrated includes an opening (21) to reduce the quantity of plastic required to produce the stake (1). It should be appreciated that the opening is not essential.

The junction illustrated in FIG. 2 includes a surface (22) from which the fin member (9) and retention means (8) extends. The surface (22) is also provided to engage the lip (15) of the pot or plant container (3) to further stabilize the stake relative to the pot or plant container (3). The junction (10) illustrated also incudes location means or depressions (23) for facilitating location of a user's digits.

The stake illustrated in FIG. 2 includes the foundation stem (5) extending from the junction (10) and having at its distal end the holding means (7) extending therefrom and means enabling connection of the extension stem. The means illustrated is a male connecting member (29) extending from the distal end of the foundation stem (5). The male member (29) is connectable to a female connecting member (30) associated with a proximal end of the extension stem (6). The illustrated holding means (7) is located at the distal end of the extension stem (6).

The holding means may be for holding a plant or a display object with FIG. 2 illustrating a plant holder (24). The plant holder (24) is best illustrated in FIGS. 3a and 3b and includes an arm (25) with a plant surround (26) located at a distal end of the arm (25) remote from the stem (5,6). The plant surround (26) is preferably in the form of a helix. The helix is preferably resilient to allow movement and expansion of the trunk. The arm (25) of the plant holder (24) preferably includes a relatively resilient hinge means (27) adjacent the distal end of the stem (5,6). The hinge means (27) illustrated is formed by a localised weakness in the arm (25), however other forms of hinge means may also be suitable. The hinge means (25) allows the arm to be angled in a direction transverse to the stem (5,6) without effecting the alignment of the stem (5,6) so as to space the plant surround (26) from the stem (5,6) as can be seen in FIG. 1. The resilient nature of the hinge (27) facilitates bringing the plant surround (26) into engagement with the trunk of the plant (2). It is intended that when attaching the helix to the plant stem the helix be oriented with its longitudinal axis perpendicular to the trunk of the plant with the trunk allowed to slide between the coils of the helix. Thereafter the helix is rotated such that the longitudinal axis of the helix may be aligned in the general vertical orientation of the trunk of the plant (2). When the foundation means (4) is located in its fixed position adjacent the plant (2) the hinge (25) will tend to angle the longitudinal axis of the helix relative to the trunk so as to bring the helix into engagement with the trunk. This manipulation of the helix may be achieved by rotating the stake (1) or the arm (25) only. Where only the arm (25) is to be manipulated it is preferred that the arm include a protrusion (28) for facilitating this manipulation.

Where the holding means (7) is for holding a display object it is preferred that the distal end of the foundation stem (5) or extension stem (6) include a display holder (31) as illustrated in FIGS. 4a and 4b. It is intended that the free end of the display holder be insertable through an aperture in the display object (not shown) to locate the display object in a display position, however other means for locating the display object in a display position are also possible. The display holder preferably includes restricting means for restricting movement of the display object relative to the display holder when the display object is in its displayed position. The restricting means illustrated includes a pair of similarly angled surfaces (32,33) located on opposite sides of the display holder (31) having upwardly and downwardly facing surfaces respectively. The surfaces (32,33) are intended to limit axial movement and pivoting movement of the display object relative to the display holder (31). The display holder illustrated also incudes a pair of wings (34,35) located adjacent the angled surfaces (32,33) for engagement by the display object, the wings (34,35) providing lateral stability to the display object. The preferred display holder (31) illustrated also includes means (36) for limiting rotational movement of the display object relative to the display, such means being preferably located at a distal end of the upwardly facing surface (32) for engaging an edge of the display object.

Referring now to FIG. 5 there is illustrated a stake having alternate form of foundation means (4'). The alternate form of foundation means (4') includes a retention means (8') and a fin member (9') extending from a foundation stem (5'). The fin member (9') operates in a manner similar to the previous fin member described in that it engages the soil or an inner surface of the plant container. The retention means (8') is intended to engage a control zone offered by the lip of the plant container.

Referring now to FIG. 6 there is illustrated a further alternate form of stake having a further alternate form of foundation means (4"). The foundation means (4") does not include a corresponding fin member but rather includes only a retention means (8"). The retention means (8") operates substantially similar to the retention means as illustrated in FIG. 2.

It is preferred the stake be formed from a plastic material such as polyolefin by a moulding method. The preferred method involves providing at least a hollow foundation stem (5) and preferably the whole stake (1) as a hollow structure. The method may include injecting the melt of molten plastic into the mold so as to partially fill the mold and using gas under pressure to disperse the melt about the mold it is preferred that the melt and gas be injected into the mold from relatively adjacent positions. It should be appreciated that using this method a stake can be produced that uses less material than a solid stake.

It will be apparent from the foregoing that the present invention provides a stake which is easier to install than existing stakes, and can be produced using less material and is attachable to the container in a positive manner.

Finally, it is to be understood that various alterations, modifications and/or additions may be introduced to the stake previously described without departing from the spirit or ambit of the invention.

What we claim is:

1. A stake for use with plants including:

a foundation means for stabilizing the stake having retention means being co-operable with a plant container for impeding removal of the stake, and being locatable in a relatively fixed position near the plant; said retention means comprising a head having a distal end adapted for insertion into a control zone of the container, wherein the insertion of the head into the control zone causes resilient deformation of the head and/or control zone to allow passage of the head through the control zone, said head tapering to a narrow region at its distal end;

a foundation stem extending from the foundation means, at least a portion of the foundation stem being hollow;

a holding means for holding the plant or a display object, the holding means being associated with the foundation stem and remote from the foundation means.

2. A stake according to claim 1 including an extension stem having a further holding means remote from the foundation means.

3. A stake according to claim 2, wherein the extension stem is hollow.

4. A stake according to claim 2 wherein the extension stem is formed integrally with the foundation means or foundation stem.

5. A stake according to claim 2 wherein the extension stem is formed independently of the rest of the stake.

6. A stake according to claim 5 wherein the extension stem is releasably connectable to the foundation means or foundation stem.

7. A stake according to claim 6 including a connection means having a male connecting member associated with the foundation stem or foundation means and a female connecting member associated with the extension stem at a connecting end of the extension stem remote from the further holding means.

8. A stake according to claim 6 including a connection means having a female connecting member associated with the foundation stem or foundation means and a male connecting member associated with the extension stem at a connecting end of the extension stem remote from the further holding means.

9. A stake according to claim 8 wherein the holding means of the foundation stem and/or extension stem includes one or more holding devices.

10. A stake according to claim 9 wherein the holding device is a plant holder for holding a plant having an arm extending from the foundation stem and/or the extension stem with a plant surround located at a distal end of the arm, the plant surround is in the form of at least a partial helix which in use accommodates the trunk of the plant.

11. A stake according to claim 10 wherein the helix is resilient to urge the helix to engage the trunk.

12. A stake according to claim 11 wherein the arm includes a hinge to allow the arm to be angled in a direction transverse to the foundation or extension stem.

13. A stake according to claim 12 wherein the hinge is resilient to urge the arm to align with the longitudinal axis of the stem to facilitate urging the plant surround to engage the trunk of the plant.

14. A stake according to claim 9 in which the holding means is for holding a display object having an aperture wherein said holding means includes a display holder insertable into the aperture of the display object to locate the display object in a display position and restricting means for restricting movement of the display object.

15. A stake according to claim 14 wherein the restricting means includes a pair of similarly angled surfaces located on opposite sides of the display holder having upwardly and downwardly facing surfaces respectively, the surfaces limiting axial and pivoting movement of the display object relative to the display holder.

16. A stake according to claim 15 wherein the restricting means further includes a pair of wings located adjacent the angled surfaces for engagement by the display object, the wings providing lateral stability to the display object.

17. A stake according to claim 16 wherein the restricting means also includes limiting means for limiting rotational movement of the display object relative to the display holder, the limiting means being located at a distal end of the upwardly facing surface which engages an edge of the display object.

18. A stake according to claim 1 wherein the retention means further includes neck and a body connected to the head by the neck.

19. A stake according to claim 1 wherein the retention means including a tip engaging member which in use engages a lip of the plant container.

20. A stake according to claim 19 wherein the foundation means includes a fin member having a pair of bearing surfaces for location within the soil surrounding the plant.

21. A stake according to claim 20 wherein the foundation means includes a junction means extending from the retention means and/or the fin member having a rim engaging surface for engaging the rim of the container to facilitate stabilisation of the foundation means.

22. A stake according to claim 21 wherein the junction means is hollow.

23. A stake according to claim 1 wherein the foundation means is hollow.

24. A stake according to claim 1 wherein the stake is formed from a plastic material using a gas injection method.

25. A stake for use with plants including:
a foundation means for stabilizing a stake having retention means being co-operable with a plant container for impeding removal of the stake, and being locatable in a relatively fixed position near the plant; said retention means comprising a head having a distal end adapted for insertion into a control zone of the container, wherein the insertion of the head into the control zone causes resilient deformation of the head and/or control zone to allow passage of the head through the control zone, said head tapering to a narrow region at its distal end;
a foundation stem extending from the foundation means;
a plant holder for holding the plant, the plant holder being associated with the foundation stem and remote from the foundation means, a plant holder including a plant surround in the form of at least a partial helix which in use surrounds the trunk of the plant at least partially.

26. A stake according to claim 25 wherein the plant holder includes an arm extending from the foundation stem, the plant surround being located at the free end of the arm.

27. A stake according to claim 26 wherein the arm includes a hinge to allow the arm to be angled in a direction transverse to the foundation or extension stem.

28. A stake according to claim 27 wherein the hinge is resilient to urge the arm to align with the longitudinal axis of the stem to facilitate urging the plant surround to engage the trunk of the plant.

29. A stake according claim 25 wherein the helix is resilient to urge the helix to engage the trunk of the plant.

30. A stake according to claim 25 further including an extension stem with a further plant holder or a display holder.

31. A stake according to claim 30 wherein the extension stem is hollow.

32. A stake according to claim 30 wherein the extension stem is formed integrally with the foundation means or foundation stem.

33. A stake according to claim 30 wherein the extension stem is formed independently of the rest of the stake.

34. A stake according to claim 33 wherein the extension stem is releasably connectable to the foundation means or foundation stem.

35. A stake according to claim 34 including a connection means having a male connecting member associated with the foundation stem or foundation means and a female connecting member associated with the extension stem at a connecting end of the extension stem remote from the further plant holder or display holder.

36. A stake according to claim 34 including a connection means having a female connecting member associated with the foundation stem or foundation means and a male connecting member associated with the extension stem at a connecting end of the extension stem remote from the further plant holder or display holder.

37. A stake according to claim 30 in which the holding means is for holding a display object having an aperture wherein said holding means includes a display holder insertable into the aperture of the display object to locate the display object in a display position and restricting means for restricting movement of the display object.

38. A stake according to claim 35 wherein the restricting means includes a pair of similarly angled surfaces located on opposite sides of a display holder having upwardly and downwardly facing surfaces respectively, the surfaces limiting axial and pivoting movement of the display object relative to the display holder.

39. A stake according to claim 38 wherein the restricting means further includes a pair of wings located adjacent the angled surfaces for engagement by the display object, the wings providing lateral stability to the display object.

40. A stake according to claim 39 wherein the restricting means also includes limiting means for limiting rotational movement of the display object relative to the display holder, the limiting mans being located at a distal end of the upwardly facing surface which engages an edge of the display object.

41. A stake according to claim 25 wherein the retention means includes a head, neck and body connected to the head by the neck, for insertion into a control zone of a container, wherein the insertion of the head into the control zone causes resilient deformation of the head and/or control zone to allow passage of the head through the control zone.

42. A stake according to claim 25 wherein the retention means includes a lip engaging member which in use engages a lip of the plant container.

43. A stake according to claim 25 wherein the foundation means includes a fin member having a pair of bearing surfaces for location within the soil surrounding the plant.

44. A stake according to claim 43 wherein the foundation means includes a junction means extending from the retention means and/or the fin member having a rim engaging surface for engaging the rim of the container to facilitate stabilisation of the foundation means.

45. A stake according to claim 25 wherein the foundation means is hollow.

46. A stake according to claim 25 wherein the junction means is hollow.

47. A stake according to claim 25 wherein the foundation stem is hollow.

48. A stake according to claim 25 wherein the stake is formed from a plastic material using a gas injection method.

* * * * *

UNITED STATES PATENT AND TRADEMARK OFFICE
CERTIFICATE OF CORRECTION

PATENT NO.    : 6,588,147 B2
DATED         : July 8, 2003
INVENTOR(S)   : Peter Kingsley Bayly and Justin McCarthy It is certified that error appears in the above-identified patent and that said Letters Patent is hereby corrected as shown below:

Column 8,
Line 2, insert -- a -- between "includes" and "neck"
Line 5, "including" should read -- includes --
Line 49, insert -- to -- between "according" and "claim"

Column 9,
Line 14, "35" should read -- 37 --
Line 26, "mans" should read -- means --

Signed and Sealed this

Sixteenth Day of September, 2003

JAMES E. ROGAN
*Director of the United States Patent and Trademark Office*